United States Patent
Zhang

(10) Patent No.: US 10,316,768 B2
(45) Date of Patent: Jun. 11, 2019

(54) SYSTEM AND METHOD FOR OPERATING DEACTIVATED CYLINDERS

(71) Applicant: Ford Global Technologies, LLC, Dearborn, MI (US)

(72) Inventor: Xiaogang Zhang, Novi, MI (US)

(73) Assignee: Ford Global Technolgies, LLC, Dearborn, MI (US)

( * ) Notice: Subject to any disclaimer, the term of this patent is extended or adjusted under 35 U.S.C. 154(b) by 332 days.

(21) Appl. No.: 15/252,925

(22) Filed: Aug. 31, 2016

(65) Prior Publication Data

US 2018/0058347 A1 Mar. 1, 2018

(51) Int. Cl.
| | |
|---|---|
| *F02D 17/02* | (2006.01) |
| *F02M 26/01* | (2016.01) |
| *F02B 75/02* | (2006.01) |
| *F02D 13/02* | (2006.01) |
| *F02D 13/06* | (2006.01) |

(52) U.S. Cl.
CPC ............ *F02D 17/026* (2013.01); *F02B 75/02* (2013.01); *F02D 13/0219* (2013.01); *F02D 13/0257* (2013.01); *F02D 13/06* (2013.01); *F02M 26/01* (2016.02); *F02B 2075/027* (2013.01); *F02B 2710/023* (2013.01); *Y02T 10/18* (2013.01)

(58) Field of Classification Search
CPC .... F02D 17/026; F02D 13/0257; F02D 13/06; F02D 13/0219; F02M 26/01; F02B 75/02; F02B 2710/023; F02B 2075/027
See application file for complete search history.

(56) References Cited

U.S. PATENT DOCUMENTS

| | | | |
|---|---|---|---|
| 7,779,823 B2 | 8/2010 | Winstead | |
| 9,512,789 B2* | 12/2016 | Lee | ........................ F02D 17/026 |
| 2014/0014080 A1 | 1/2014 | Beshay et al. | |

* cited by examiner

*Primary Examiner* — Hung Q Nguyen
(74) *Attorney, Agent, or Firm* — Julia Voutyras; McCoy Russell LLP

(57) ABSTRACT

Systems and methods for operating an engine that includes cylinders that may be deactivated are presented. In one example, intake and exhaust valves of a cylinder may be operated according to valve operation for a conventional four stroke cycle. The same valves may be operated differently during a four stroke cycle to provide air charge and exhaust charge to active cylinders during a different four stroke cycle.

20 Claims, 5 Drawing Sheets

SYSTEM AND METHOD FOR OPERATING DEACTIVATED CYLINDERS

FIELD

The present description relates to a system and methods for operating a variable displacement engine. The system and methods may provide useful work from deactivated cylinders.

BACKGROUND AND SUMMARY

A variable displacement engine includes engine cylinders that may be deactivated from time to time to conserve fuel. By deactivating a fraction of the engine's cylinders, activated cylinders may be operated at a higher efficiency. Pistons of deactivated cylinders may reciprocate within the deactivated cylinders while intake and exhaust valves of the cylinders are held closed. The deactivated cylinders may hold fresh air or exhaust to reduce vacuum within the cylinders, but engine power may be lost by compressing and expanding the air. The compression and expansion of the air provides minimal useful work. Therefore, it would be desirable to increase the amount of useful work provided by one or more deactivated cylinders.

The inventor herein has recognized the above-mentioned issues and has developed an engine control method, comprising: deactivating a cylinder of an engine via a controller ceasing to supply fuel to the cylinder, the engine a four stroke engine; and drawing air into the deactivated cylinder from a vacuum reservoir during a first stroke of four strokes in a cycle of the deactivated cylinder, the air drawn into the deactivated cylinder without having passed through a passage of an intake manifold that leads to other cylinders of the engine.

By adjusting valve timing of a deactivated cylinder, the deactivated cylinder may be utilized in a way that may increase engine efficiency while the cylinder is deactivated. Specifically, a second intake valve may be opened to provide vacuum to a vacuum reservoir during an intake stroke of the deactivated cylinder. The air inducted to the cylinder may then be ejected to the engine's intake manifold to increase intake manifold pressure and feed other engine cylinders with air. The exhaust valves of the deactivated cylinder may be opened during a power stroke of the deactivated cylinder to draw exhaust gas into the deactivated cylinder. The first intake valve may be opened during an exhaust stroke of the cylinder to recirculate exhaust gas to other engine cylinders.

The present description may provide several advantages. In particular, the approach may improve engine efficiency when an engine operates with one or more deactivated cylinders. Additionally, the approach may provide vacuum when vacuum production may be difficult. Further, the approach may provide higher exhaust gas recirculation (EGR) flow rates during conditions when intake manifold pressure may be higher.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The advantages described herein will be more fully understood by reading an example of an embodiment, referred to herein as the Detailed Description, when taken alone or with reference to the drawings, where.

DETAILED DESCRIPTION

Figure 1:
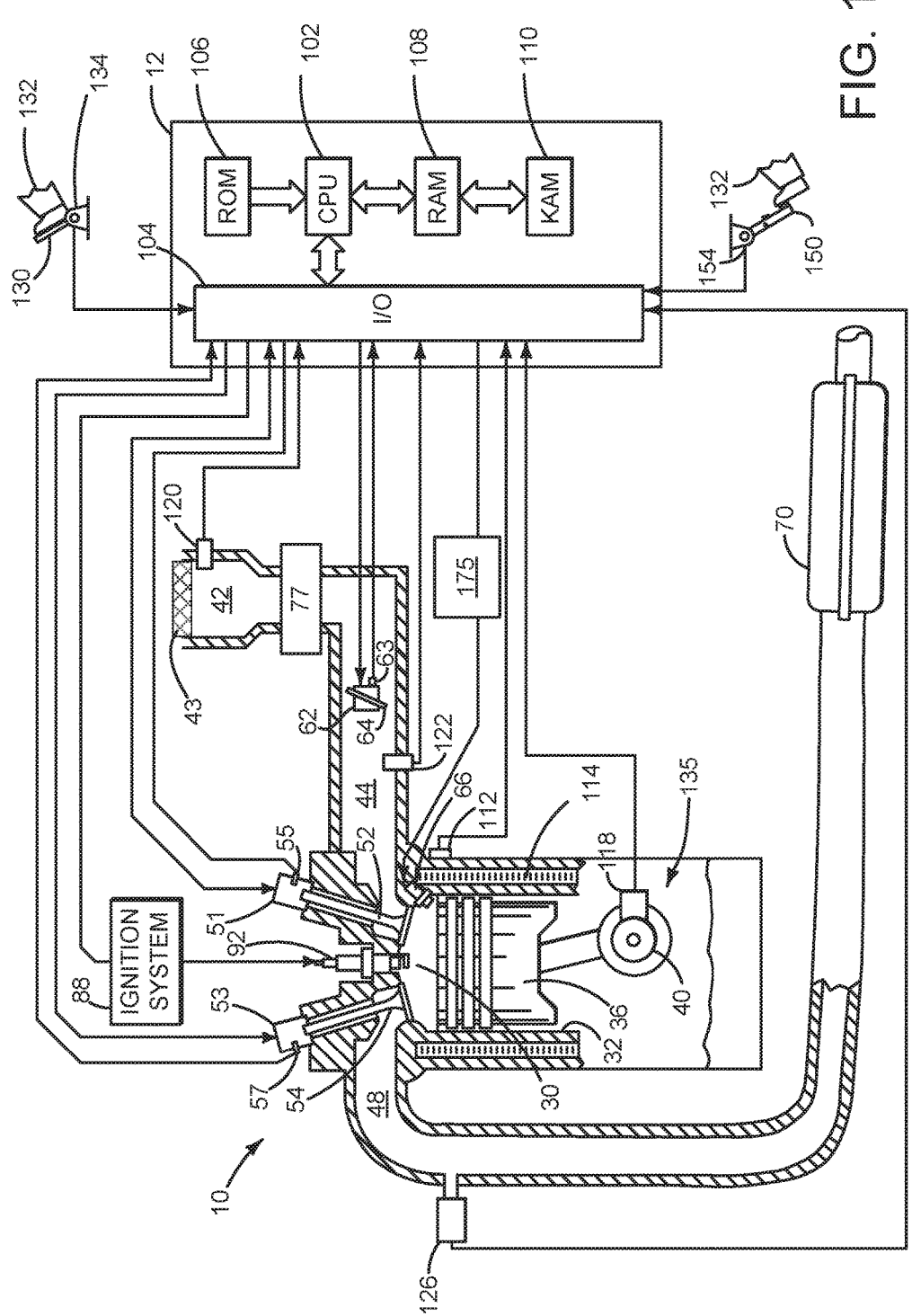
FIG. 1 is a schematic diagram of an engine.
Figure 2A:
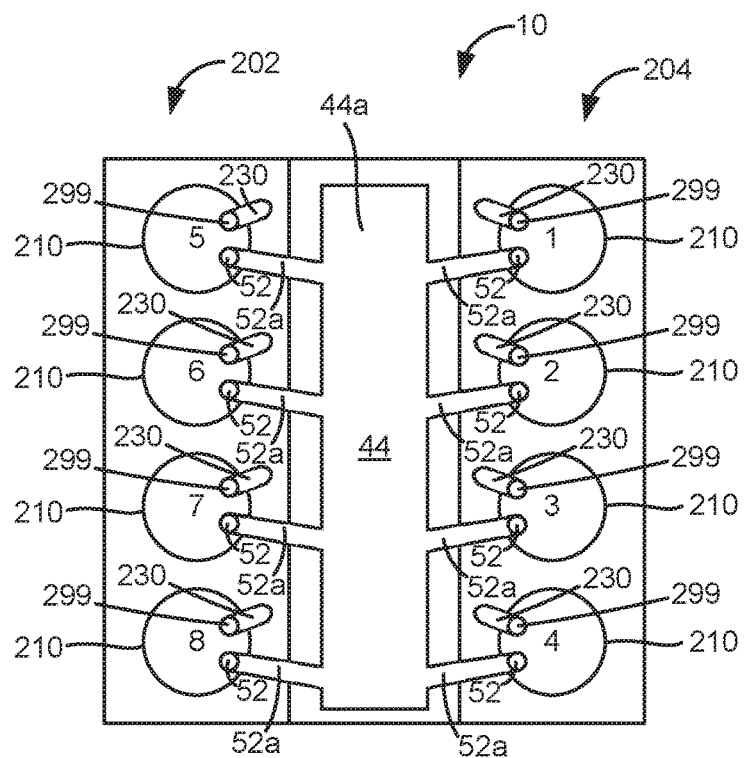
FIG. 2A is a schematic diagram of an eight cylinder engine with two cylinder banks.
Figure 2B:
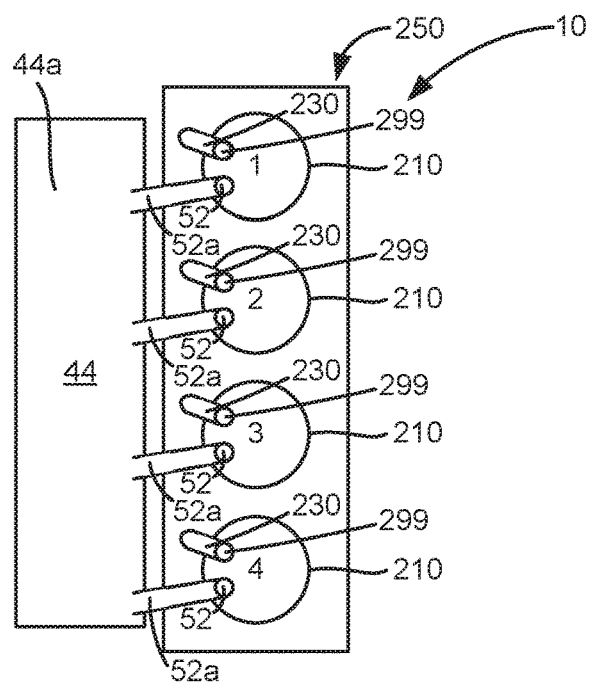
FIG. 2B is a schematic diagram of a four cylinder engine with a single cylinder bank.
Figure 3:
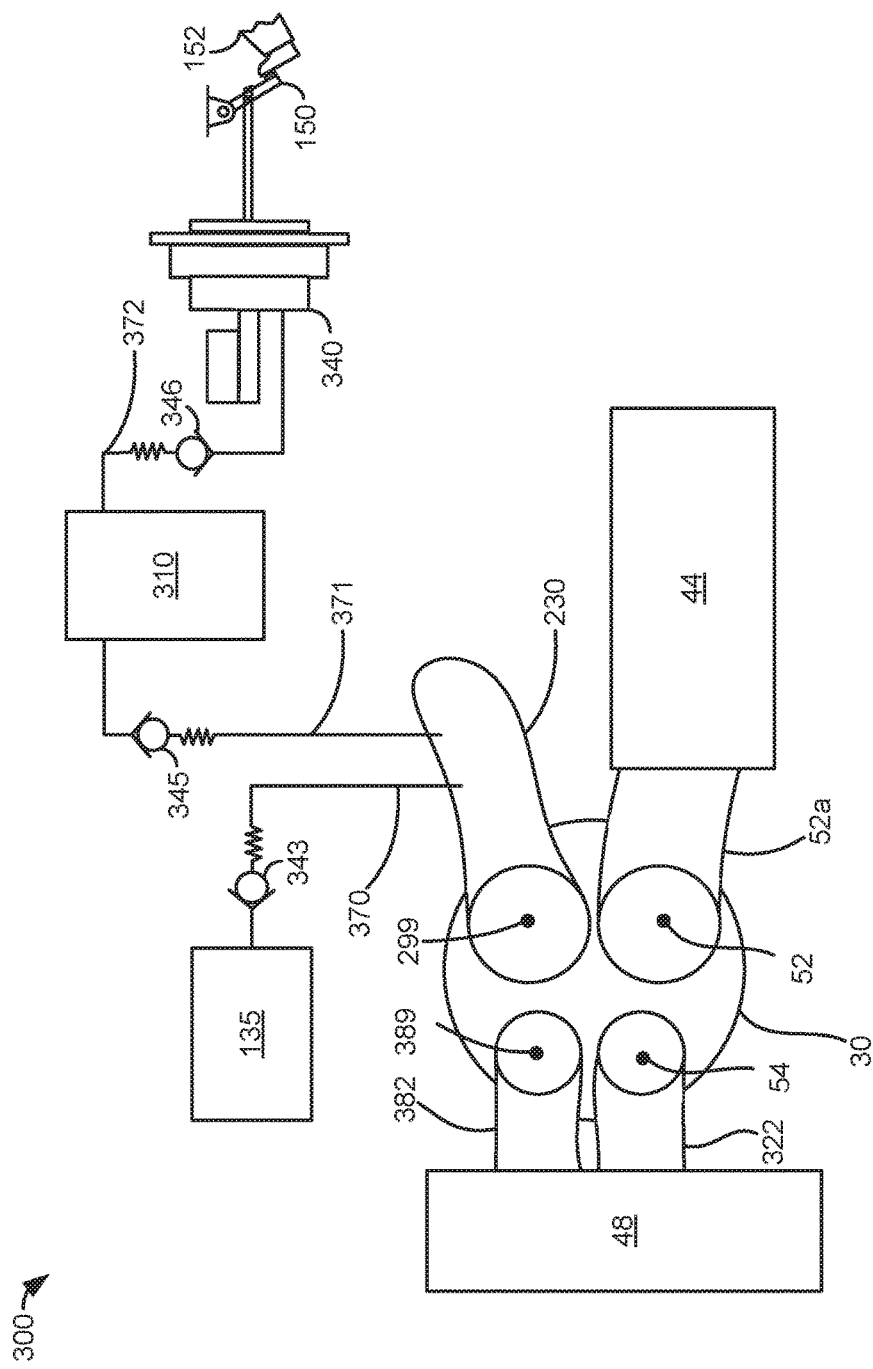
FIG. 3 is a detailed schematic of passages leading to a cylinder.

The present description is related to operating an engine with one or more cylinders that may be deactivated from time to time. The engine may be a boosted engine as shown in FIG. 1 or a naturally aspirated engine. The engine may include one or two cylinder banks as shown in FIGS. 2A and 2B. Cylinders of the engine may be supplied air via passages as shown in FIG. 3. One or more engine cylinders may operate as shown in the operating sequence of FIG. 4. The engine cylinders may be operated according to the method of FIG. 5.

Referring to FIG. 1, internal combustion engine 10, comprising a plurality of cylinders, one cylinder of which is shown in FIG. 1, is controlled by electronic engine controller 12. Engine 10 includes combustion chamber 30 and cylinder walls 32 with piston 36 positioned therein and connected to crankshaft 40. Crankcase 135 encloses crankshaft 40 and provides a barrier to atmospheric conditions.

Combustion chamber 30 is shown communicating with intake manifold 44 and exhaust manifold 48 via respective intake valve 52 and exhaust valve 54. Each intake and exhaust valve may be operated by an intake valve operator 51 and an exhaust valve operator 53. The intake valve position may be determined by sensor 55. Exhaust valve position may be determined by sensor 57. Intake valve operator 51 and exhaust valve operator 53 may be mechanically, electrically, or hydraulically operated. Further, intake valve operator 51 and exhaust valve operator 53 may operate synchronously or asynchronously with crankshaft 40.

Fuel injector 66 is shown positioned to inject fuel directly into cylinder 30, which is known to those skilled in the art as direct injection. Alternatively, fuel may be injected to an intake port, which is known to those skilled in the art as port injection. Fuel injector 66 delivers liquid fuel in proportion to the pulse width of signal from controller 12. Fuel is delivered to fuel injector 66 by a fuel system 175. In addition, intake manifold 44 is shown communicating with optional electronic throttle 62 (e.g., a butterfly valve) which adjusts a position of throttle plate 64 to control air flow from air filter 43 and air intake 42 to intake manifold 44. Throttle 62 regulates air flow from compressor 77 and air filter 43 in engine air intake 42 to intake manifold 44. In some examples, throttle 62 and throttle plate 64 may be positioned between intake valve 52 and intake manifold 44 such that throttle 62 is a port throttle. Compressor 77 may be driven via exhaust gases or via a belt (not shown) driven via crankshaft 40.

Distributorless ignition system 88 provides an ignition spark to combustion chamber 30 via spark plug 92 in response to controller 12. Universal Exhaust Gas Oxygen (UEGO) sensor 126 is shown coupled to exhaust manifold 48 upstream of catalytic converter 70. Alternatively, a two-state exhaust gas oxygen sensor may be substituted for UEGO sensor 126.

Converter 70 can include multiple catalyst bricks, in one example. In another example, multiple emission control devices, each with multiple bricks, can be used. Converter 70 can be a three-way type catalyst in one example.

Controller 12 is shown in FIG. 1 as a conventional microcomputer including: microprocessor unit 102, input/output ports 104, read-only memory 106 (e.g., non-transitory memory), random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a position sensor 134 coupled to an accelerator pedal 130 for sensing force applied by human driver 132; a measurement of engine manifold pressure (MAP) from pressure sensor 122 coupled to intake manifold 44; an engine position sensor from a Hall effect sensor 118 sensing crankshaft 40 position; a measurement of air mass entering the engine from sensor 120; brake pedal position from brake pedal position sensor 154 when human driver 132 applies brake pedal 150; and a measurement of throttle position from sensor 63. Barometric pressure may also be sensed (sensor not shown) for processing by controller 12. In a preferred aspect of the present description, engine position sensor 118 produces a predetermined number of equally spaced pulses every revolution of the crankshaft from which engine speed (RPM) can be determined.

In some examples, the engine may be coupled to an electric motor/battery system in a hybrid vehicle. Further, in some examples, other engine configurations may be employed, for example a diesel engine.

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into combustion chamber 30 via intake manifold 44, and piston 36 moves to the bottom of the cylinder so as to increase the volume within combustion chamber 30. The position at which piston 36 is near the bottom of the cylinder and at the end of its stroke (e.g. when combustion chamber 30 is at its largest volume) is typically referred to by those of skill in the art as bottom dead center (BDC). During the compression stroke, intake valve 52 and exhaust valve 54 are closed. Piston 36 moves toward the cylinder head so as to compress the air within combustion chamber 30. The point at which piston 36 is at the end of its stroke and closest to the cylinder head (e.g., when combustion chamber 30 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 92, resulting in combustion. During the expansion stroke, the expanding gases push piston 36 back to BDC. Crankshaft 40 converts piston movement into a rotational torque of the rotary shaft. Finally, during the exhaust stroke, the exhaust valve 54 opens to release the combusted air-fuel mixture to exhaust manifold 48 and the piston returns to TDC. Note that the above is shown merely as an example, and that intake and exhaust valve opening and/or closing timings may vary, such as to provide positive or negative valve overlap, late intake valve closing, or various other examples.

Referring now to FIG. 2A, an example plan view schematic of a multi-cylinder engine that includes two cylinder banks is shown. The engine includes cylinders and associated components as shown in FIG. 1. Engine 10 includes eight cylinders 210. Each of the eight cylinders is numbered and the numbers of the cylinders are included within the cylinders. Cylinders 1-8 may be selectively deactivated via ceasing to supply fuel and/or spark to the deactivated cylinders. One or more cylinders may be deactivated to improve engine fuel economy when less than the engine's full torque capacity is requested. For example, cylinders 2, 3, 5, and 8 (e.g., a pattern of deactivated cylinders) may be deactivated during an engine cycle (e.g., two revolutions for a four stroke engine). During a different engine cycle, cylinders 1, 4, 6, and 7 may be deactivated. Further, other patterns of cylinders may be selectively deactivated based on vehicle operating conditions.

Engine 10 includes a first cylinder bank 204, which includes four cylinders 1, 2, 3, and 4. Engine 10 also includes a second cylinder bank 202, which includes four cylinders 5, 6, 7, and 8. Cylinders of each bank may be active or deactivated during a cycle of the engine. Intake manifold 44 supplies air to each cylinder that is activated (e.g., combusting fuel during a cycle of the engine) via passages 52a and intake valves 52. Thus, intake manifold 44 supplies air to a plurality of engine cylinders via passages 52a. Each of the eight cylinders also includes a second intake valve 299 and a second passage 230. Passage 230 may be incorporated into a cylinder head and/or intake manifold, but passage 230 does not pneumatically communicate with intake manifold 44 unless intake valves 52 and 299 are simultaneously open. Passage 230 does not directly lead to plenum 44a, which distributes air passing through the engine throttle (not shown) to all engine cylinders. Passage 230 may communicate with intake manifold 44 through cylinder 210 when intake valves 52 and 299 are simultaneously open. Thus, passage 230 is pneumatically isolated from a portion of intake manifold 44 that is in communication with other cylinders of engine 10 when intake valve 299 is closed. Passage 230 is a closed sealed volume except for access to passage 230 may be provided by opening intake valve 299. Further, passage 230 may be pneumatically coupled to a vacuum reservoir or the engine crankcase 135 as shown in FIG. 3.

Referring now to FIG. 2B, an example plan view schematic of a multi-cylinder engine that includes one cylinder banks is shown. The engine includes cylinders and associated components as shown in FIG. 1. Engine 10 includes four cylinders 210. Each of the four cylinders is numbered and the numbers of the cylinders are included within the cylinders. Cylinders 1-4 may be selectively deactivated to improve engine fuel economy when less than the engine's full torque capacity is requested. For example, cylinders 2 and 3 (e.g., a pattern of deactivated cylinders) may be deactivated during an engine cycle (e.g., two revolutions for a four stroke engine). During a different engine cycle, cylinders 1 and 4 may be deactivated. Further, other patterns of cylinders may be selectively deactivated based on vehicle operating conditions.

Engine 10 includes a single cylinder bank 250, which includes four cylinders 1-4. Cylinders of the single bank may be active or deactivated during a cycle of the engine. Engine 10 includes a first cylinder bank 204, which includes four cylinders 1, 2, 3, and 4. Intake manifold 44 supplies air to each cylinder that is activated (e.g., combusting fuel during a cycle of the engine) via passages 52a and intake valves 52. Thus, intake manifold 44 supplies air to a plurality of engine cylinders via passages 52a. Each of the four cylinders also includes a second intake valve 299 and a second passage 230. Passage 230 may be incorporated into a cylinder head and/or intake manifold, but passage 230 does not pneumatically communicate with intake manifold 44 unless intake valves 52 and 299 are simultaneously open. Passage 230 does not directly lead to plenum 44a, which distributes air passing through the engine throttle (not shown) to all engine cylinders. Passage 230 may communicate with intake manifold 44 through cylinders 210 when intake valves 52 and 299 are simultaneously open. Thus, passage 230 is pneumatically isolated from a portion of intake manifold 44 that is in communication with other cylinders of engine 10 when intake valve 299 is closed. Passage 230 is a closed sealed volume except for access to passage 230 may be provided by opening intake valve 299. Further, passage 230 may be pneumatically coupled to a vacuum reservoir or the engine crankcase 135 as shown in FIG. 3.

Referring now to FIG. 3, a schematic plan view showing details of passages leading to or exiting combustion chamber 30 is shown. Fresh air may enter combustion chamber 30 via intake manifold 44, passage 52a, and intake valve 52. Air may also enter combustion chamber 30 via intake valve 299, passage 230, and vacuum reservoir 310 or engine crankcase 135. Conduit 370 pneumatically couples passage 230 to engine crankcase 135 via check valve 343. Check valve 343 allows gas to flow from crankcase 135 to passage 230, but stops flow from passage 230 to crankcase 135. Conduit 371 pneumatically couples passage 230 to vacuum reservoir 310 via check valve 345. Check valve 345 allows air to flow from vacuum reservoir 310 to passage 230, but stops flow from passage 230 to reservoir 310. Conduit 372 pneumatically couples vacuum reservoir 310 to brake booster 340 via check valve 346. Check valve 346 allows air to flow from brake booster 340 to vacuum reservoir 310, but stops flow from vacuum reservoir 310 to brake booster 340. Air may enter brake booster 340 when human driver 152 applies and releases brake pedal 150. Passages 382 and 322 pneumatically couple exhaust manifold 48 to combustion chamber 30 via exhaust valves 54 and 389.

Figure 4:
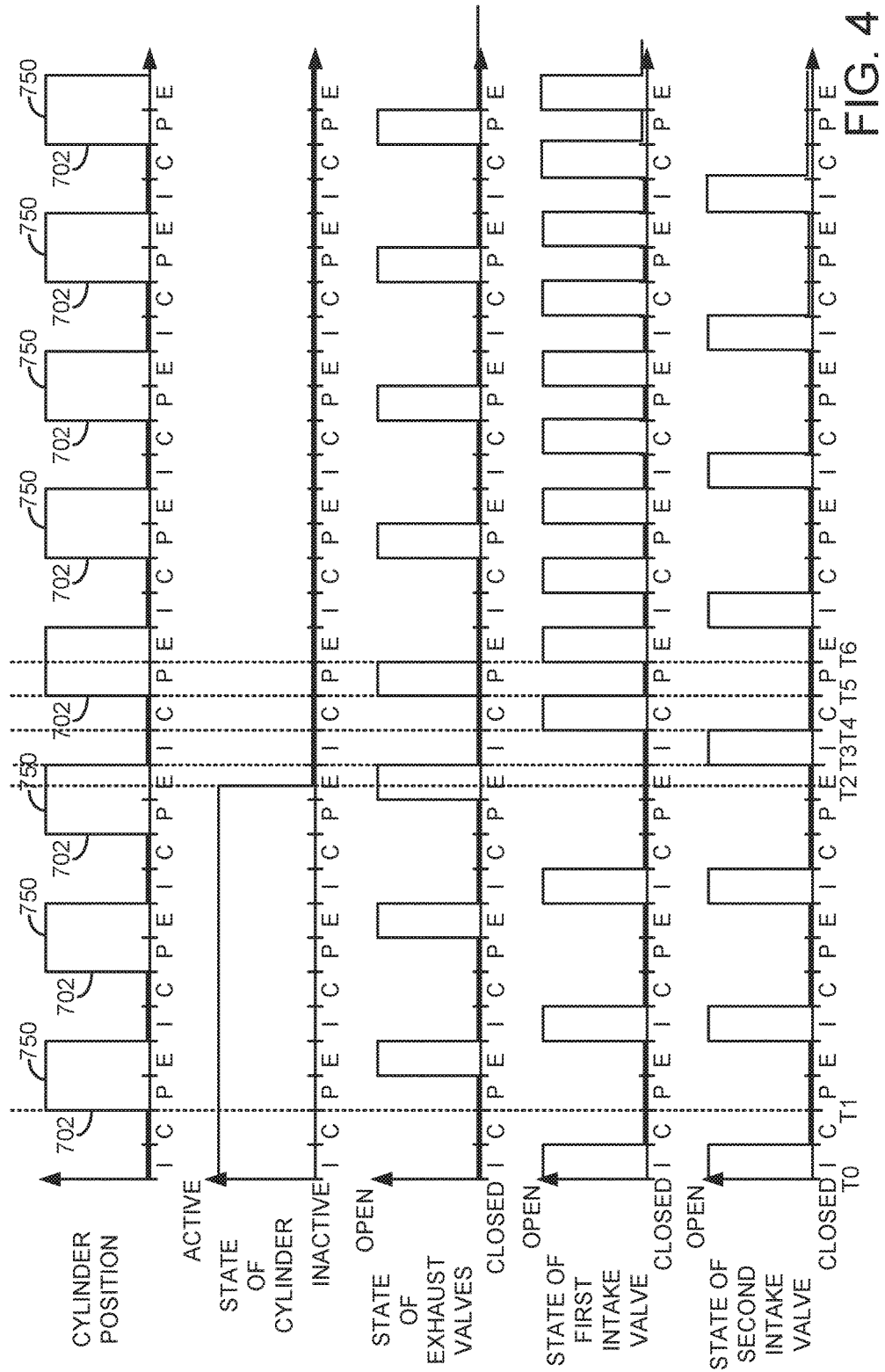
FIG. 4 is an operating sequence of a cylinder of an engine.

During conventional four stroke operation when air and fuel are combusted in cylinder or combustion chamber 30, intake valves 52 and 299 open during an intake stroke so that air may be inducted from intake manifold, vacuum reservoir 310, and crankcase 135 into combustion chamber or cylinder 30. Exhaust valves 54 and 389 open so that exhaust gases may be ejected to exhaust manifold 48 during an exhaust stroke of cylinder or combustion chamber 30. On the other hand, if cylinder or combustion chamber 30 is deactivated (e.g., not combusting air and fuel during a four stroke cycle), opening times of intake valves 52 and 299 are adjusted to different timings as shown in the sequence of FIG. 4. Likewise, opening times of exhaust valves 54 and 389 are adjusted to different timings as shown in the sequence of FIG. 4.

For example, during a first stroke of a cylinder cycle when combustion chamber or cylinder 30 is deactivated, intake valve 299 is open while intake valve 52 is closed. Exhaust valves 54 and 389 are closed. During the first stroke, the piston of cylinder or combustion chamber 30 is traveling in a downward direction expanding the volume of cylinder or combustion chamber 30. Consequently, air is drawn into cylinder or combustion chamber 30 from vacuum reservoir 310 and crankcase 135. During a second stroke of the cylinder cycle when combustion chamber or cylinder 30 is deactivated, intake valve 299 is closed while intake valve 52 is open. Exhaust valves 54 and 389 are closed. During the second stroke, the piston of cylinder or combustion chamber 30 is traveling in an upward direction reducing the volume of cylinder or combustion chamber 30. Consequently, air is expelled into intake manifold 44 from cylinder or combustion chamber 30. During a third stroke of the cylinder cycle when combustion chamber or cylinder 30 is deactivated, intake valve 299 and intake valve 52 are closed. During the third stroke, the piston of cylinder or combustion chamber 30 is traveling in a downward direction expanding the volume of cylinder or combustion chamber 30. Consequently, exhaust from other active cylinders is drawn into cylinder or combustion chamber 30 from exhaust manifold 48. During a fourth stroke of the cylinder cycle when combustion chamber or cylinder 30 is deactivated, intake valve 299 is closed while intake valve 52 is open. Exhaust valves 54 and 389 are closed. During the fourth stroke, the piston of cylinder or combustion chamber 30 is traveling in an upward direction reducing the volume of cylinder or combustion chamber 30. Consequently, exhaust is expelled into intake manifold 44 from cylinder or combustion chamber 30 so that exhaust gas recirculation to other engine cylinders may be increased.

The system of FIGS. 1-3 provides for an engine system, comprising: an engine including a plurality of cylinders, one cylinder of the plurality of cylinders including a passage leading to the one cylinder via a second intake valve, the passage not leading to an area of an intake manifold in pneumatic communication with other engine cylinders of the engine when a second intake valve of the cylinder is closed, the passage in pneumatic communication with a vacuum reservoir when the second intake valve is closed. The engine system further comprises a controller, the controller including executable instructions stored in non-transitory memory to open the second intake valve of the cylinder during a first stroke of a cycle of the cylinder to draw the air into the cylinder from the vacuum reservoir.

In some examples, the engine system includes additional instructions to open a first intake valve of the cylinder while the second intake valve of the cylinder is closed during a second stroke of the cycle of the cylinder. The engine system includes additional instructions to open exhaust valves of the deactivated cylinder while the first and second intake valves of the cylinder are closed during a third stroke of the cycle of the cylinder. The engine system includes additional instructions to open the first intake valve of the cylinder while the second intake valve of the cylinder is closed during a fourth stroke of the cycle of the cylinder. The engine system includes where the cylinder is deactivated by ceasing to flow fuel to the cylinder.

Referring now to FIG. 4, an example prophetic sequence that shows valve operation for a cylinder that is active and then deactivated is shown. The sequence of FIG. 4 may be provided according to the method of FIG. 5 and the system of FIGS. 1-3. The plots shown in FIG. 4 occur at the same time and are aligned in time.

The first plot from the top of FIG. 4 is a plot of a trace that indicates cylinder position versus crankshaft position. The crankshaft position is indicated by vertical marks along the horizontal axis. Specifically, the horizontal axis is subdivided into sections that represent strokes of the cylinder "I" indicates intake stroke, "C" indicates compression stroke, "P" indicates power stroke, "E" indicates exhaust stroke. The cylinder strokes for the cylinder having a position indicated by trace 750 are separated via small vertical markers that are separated by 180 crankshaft degrees. Thus, there are 180 crankshaft degrees between each cylinder cycle. As such, an intake valve that opens at a beginning of an intake stroke and closes at the end of the intake stroke is open for a crankshaft interval of 180 crankshaft degrees. Likewise, for valve timing events that occur during other strokes of the cylinder. Trace 750 indicates the position of a cylinder of the engine. In particular, a rising edge 702 of trace 750 indicates that the piston is at top-dead-center compression stroke of the cylinder. As the engine rotates, the cylinder proceeds through the other engine strokes and trace 750 transitions to a lower level before another rising edge 702 indicates that the engine has completed one cycle (e.g., two engine revolutions) and is back at top-dead-center compression stroke for the cylinder.

The second plot from the top of FIG. 4 is a plot of state of the cylinder versus crankshaft position. The vertical axis represents the cylinder state and the cylinder is active and combusting air and fuel when the trace is at a higher level near the vertical axis arrow. The cylinder is deactivated not combusting air and fuel when the trace is at a lower level near the horizontal axis. The horizontal axis represents stroke and position of the cylinder as previously discussed.

The third plot from the top of FIG. 4 is a plot of state of the exhaust valves of the cylinder versus crankshaft position. The vertical axis represents the exhaust valve and the exhaust valves are open when the trace is at a higher level near the vertical axis arrow. The exhaust valves are closed when the trace is at a lower level near the horizontal axis. The horizontal axis represents stroke and position of the cylinder as previously discussed.

The fourth plot from the top of FIG. 4 is a plot of state of a first intake valve of the cylinder versus crankshaft position. The vertical axis represents the first intake valve state and the first intake valve is open when the trace is at a higher level near the vertical axis arrow. The first intake valve is closed when the trace is at a lower level near the horizontal axis. The horizontal axis represents stroke and position of the cylinder as previously discussed.

The fifth plot from the top of FIG. 4 is a plot of state of a second intake valve of the cylinder versus crankshaft position. The vertical axis represents the second intake valve state and the second intake valve is open when the trace is at a higher level near the vertical axis arrow. The second intake valve is closed when the trace is at a lower level near the horizontal axis. The horizontal axis represents stroke and position of the cylinder as previously discussed.

At time T0, the cylinder is active and combusting air and fuel as indicated by the state of the cylinder trace being at a higher level. The cylinder is starting an intake stroke and the first and second intake valves are in an open state as indicated by their respective traces being at a higher level.

At time T1, the engine has rotated through the intake and compression strokes and arrived at top-dead-center for the cylinder. The cylinder state indicates that the cylinder is active combusting air and fuel.

Between time T1 and time T2, the engine rotates through several engine and cylinder cycles. The cylinder cycle repeats every four strokes. The intake valves are open during the intake stroke of the cylinder and the exhaust valve are open during the exhaust stroke of the cylinder. It should be noted that in some examples that actual valve timings for intake and exhaust valves may deviate slightly from those shown in FIG. 4 without departing from the spirit of this disclosure. For example, the exhaust valve may open ten crankshaft degrees before the exhaust stroke begins.

At time T2, the cylinder changes state from active to being deactivated. Fuel injection ceases to the cylinder and exhaust from a last combustion event in the cylinder is ejected to the exhaust manifold when the exhaust valves are open. The cylinder is deactivated during its exhaust stroke, but the cylinder may begin deactivation at an earlier crankshaft angle in some examples. The valve timing is adjusted in response to the cylinder beginning at the next stroke of the cylinder, which would have been an intake stroke if the valve timing had continued on in conventional valve timing mode.

At time T3, the intake stroke begins and the second intake valve is opened so that air may be drawn from the vacuum reservoir and the crankcase into the cylinder. The first intake valve and the exhaust valves are closed while the second intake valve is open so that vacuum in the cylinder brought about by expansion of the cylinder volume caused by the piston moving away from the cylinder head may be used to increase vacuum in the vacuum reservoir. The amount of air entering the cylinder may be estimated based on cylinder pressure and pressure in the vacuum reservoir.

At time T4, the first intake valve is opened and the second intake valve is closed while the exhaust valves are closed at the beginning of the compression stroke of the cylinder. The piston begins moving toward the cylinder head, thereby reducing the cylinder volume and pressurizing air in the cylinder and ejecting the air to the engine intake manifold where it may be inducted by active engine cylinders. Opening the first intake valve allows air to flow into the intake manifold where intake pressure may be boosted in an effort to improve engine efficiency.

At time T5, the first and second intake valves are closed while the exhaust valves are opened at the beginning of the power stroke of the cylinder. The piston begins moving away from the cylinder head to increase cylinder volume and lowing pressure in the cylinder so that exhaust gases may be drawn into the cylinder from the exhaust manifold. Closing the intake valves and opening the exhaust valves causes exhaust gas to be drawn into the cylinder without drawing air into the cylinder so that the amount of exhaust in the cylinder may be increased.

At time T6, the first intake valve is opened and the second intake valve is closed while the exhaust valves are closed at the beginning of the exhaust stroke of the cylinder. The piston begins moving toward the cylinder head, thereby reducing the cylinder volume and pressurizing exhaust in the cylinder and ejecting the exhaust to the engine intake manifold where it may be inducted by active engine cylinders. Opening the first intake valve allows exhaust to flow into the intake manifold. It should be noted that the intake valve timings and exhaust valve timings may be adjusted to increase or decrease air flow and exhaust gas flow into the engine intake manifold. The cycle repeats after the exhaust stroke at time T6.

Figure 5:
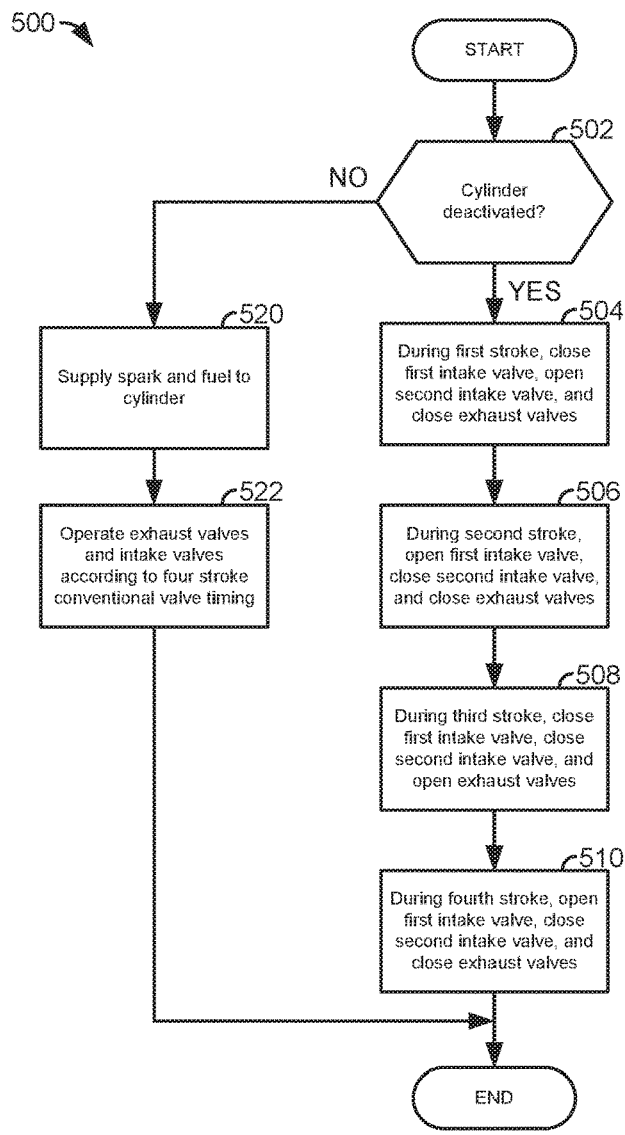
FIG. 5 is a flowchart of a method for operating a cylinder of an engine.

Referring now to FIG. 5, a method for operating a cylinder of an engine is shown. The method of FIG. 5 may be incorporated into the system of FIGS. 1-3 as executable instructions stored in non-transitory memory. Further, portions of the method of FIG. 5 may be actions taken in the real world to change an operating state of the system of FIGS. 1-3. In addition, the method of FIG. 5 may provide the operating sequence shown in FIG. 4.

At 502, method 500 judges if the cylinder is deactivated or requested to be deactivated. The cylinder may be requested deactivated based on engine speed and load or other vehicle conditions. A variable stored in memory may indicate whether or not the cylinder is deactivated. For example, if a bit in memory has a value of zero, the cylinder may be deactivated. If the bit in memory has a value of one, the cylinder may be active. The cylinder is deactivated by ceasing to flow fuel to the cylinder. Additionally, spark delivery to the deactivated cylinder may be halted. If method 500 judges that the cylinder is deactivated, the answer is yes and method 500 proceeds to 504. Otherwise, the answer is no and method 500 proceeds to 520.

At 504, method 500 closes a first intake valve and opens a second intake valve of the deactivated while the exhaust valves of the deactivated cylinder are held closed during a stroke that would have been an intake stroke if the cylinder had been activated. The cylinders piston is traveling in a direction that increases cylinder volume during the stroke of the cylinder. By closing the first intake valve, the cylinder is isolated and sealed off from an area of the intake manifold that is in pneumatic communication with other engine cylinders. Opening the second intake valve allows air to be drawn into the cylinder from a vacuum reservoir or the engine crankcase. Closing the exhaust valves pneumatically isolates the cylinder from the exhaust manifold so that a vacuum may develop as the piston approaches bottom-dead-center. Method 500 proceeds to 506.

At 506, method 500 opens the first intake valve and closes the second intake valve of the deactivated while the exhaust valves of the deactivated cylinder are held closed during a stroke that would have been a compression stroke if the cylinder had been activated. The cylinders piston is traveling in a direction that decreases cylinder volume during the stroke of the cylinder. By opening the first intake valve, the cylinder is exposed to the intake manifold so that air drawn into the cylinder from the vacuum reservoir may be delivered to the intake manifold to increase pressure in the engine intake manifold. Closing the second intake valve pneumatically isolates the cylinder from the vacuum reservoir and the engine crankcase. Method 500 proceeds to 508.

At 508, method 500 closes the first and second intake valves and opens the exhaust valves of the deactivated cylinder during a stroke that would have been a power stroke if the cylinder had been activated. The cylinders piston is traveling in a direction that increases cylinder volume during the stroke of the cylinder. By closing the first and second intake valves, the cylinder is pneumatically isolated and sealed off from the intake manifold and the vacuum reservoir. Opening the exhaust valves allows exhaust gas from other engine cylinders to flow into the cylinder using vacuum may develop in the cylinder as the piston approaches bottom-dead-center. Method 500 proceeds to 510.

At 510, method 500 opens the first intake valve and closes the second intake valve of the deactivated while the exhaust valves of the deactivated cylinder are held closed during a stroke that would have been an exhaust stroke if the cylinder had been activated. The cylinders piston is traveling in a direction that decreases cylinder volume during the stroke of the cylinder. By opening the first intake valve, exhaust in the cylinder may be ejected into the intake manifold so that exhaust gas may be recirculated to active engine cylinders. Method 500 proceeds to exit.

At 520, method 500 supplies spark and fuel to the cylinder so that an air-fuel mixture in the cylinder may be combusted, thereby producing torque for the engine. Method 500 proceeds to 522.

At 522, method 500 operates intake and exhaust valves according to a four stroke conventional engine cycle. In particular, the intake valves are opened during the cylinder's intake stroke while the exhaust valves are closed. The intake and exhaust valve are closed during the compression and power strokes. The exhaust valves are opened and the intake valves are closed during the exhaust stroke. It should be notes that in some examples, the second intake valve may be opened during intake cycles only in response to a request for additional vacuum in a vacuum reservoir. Method 500 proceeds to exit.

It should be noted that there may be some overlap of intake valve timing and exhaust valve timing into cylinder strokes adjacent to the cylinder strokes mentioned in method 500. For example, an intake valve may be open for a few crankshaft degrees (e.g., less than 25 crankshaft degrees) of an exhaust stroke or compression stroke when the intake valve is described as being open during an intake stroke. The intake valve timing may be adjusted this way to increase or decrease air flow into or out of the cylinder. The exhaust valves may be operated similarly.

Thus, the method of FIG. 5 provides for an engine control method, comprising: deactivating a cylinder of an engine via a controller ceasing to supply fuel to the cylinder, the engine a four stroke engine; and drawing air into the deactivated cylinder from a vacuum reservoir during a first stroke of four strokes in a cycle of the deactivated cylinder, the air drawn into the deactivated cylinder without having passed through a passage of an intake manifold that leads to other cylinders of the engine. The method further comprises opening an second intake valve of the deactivated cylinder during a first stroke of a cycle of the deactivated cylinder to draw the air into the deactivated cylinder from the vacuum reservoir. The method further comprises opening a first intake valve of the deactivated cylinder while the second intake valve of the deactivated cylinder is closed during a second stroke of the cycle of the deactivated cylinder. The method further comprises discharging the air to an intake manifold of the engine during the second stroke of the cycle of the deactivated cylinder.

In some examples, the method further comprises opening exhaust valves of the deactivated cylinder while the first and second intake valves of the deactivated cylinder are closed during a third stroke of the cycle of the deactivated cylinder. The method further comprises drawing exhaust gas into the deactivated cylinder during the third stroke of the cycle of the deactivated cylinder. The method further comprises opening the first intake valve of the deactivated cylinder while the second intake valve of the deactivated cylinder is closed during a fourth stroke of the cycle of the deactivated cylinder.

The method of FIG. 5 also provides for an engine control method, comprising: operating a cylinder of an engine with four strokes in a first cycle of the engine, the four strokes including a first stroke defined by a first crankshaft angular interval, the first stroke an intake stroke, a second stroke defined by a second crankshaft angular interval, the second stroke a compression stroke, a third stroke defined by a third crankshaft angular interval, the third stroke a power stroke, and a fourth stroke defined by a fourth crankshaft angular interval, the fourth stroke an exhaust stroke; deactivating the cylinder of an engine via a controller ceasing to supply fuel to the cylinder; and opening exhaust valves of the cylinder during the third crankshaft interval of a second cycle of the engine while the cylinder is deactivated and drawing exhaust gas from cylinders other than the cylinder into the cylinder.

The method includes where first and second intake valves of the cylinder are closed during the third crankshaft interval of the second cycle of the engine. The method further comprises opening a second intake valve and while a first intake valve of the cylinder is closed during the first crankshaft interval of the second cycle of the engine. The method further comprises opening the first intake valve while the second intake valve of the cylinder is closed during the second crankshaft interval of the second cycle of the engine. The method further comprises opening the first intake valve while the second intake valve of the cylinder is closed during the fourth crankshaft interval of the second cycle of the engine. The method further comprises combusting air and fuel in at least one cylinder of the engine while the cylinder is deactivated. The method further comprises combusting air and fuel in the cylinder during the first cycle of the engine.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, at least a portion of the described actions, operations and/or functions may graphically represent code to be programmed into non-transitory memory of the computer readable storage medium in the control system. The control actions may also transform the operating state of one or more sensors or actuators in the physical world when the described actions are carried out by executing the instructions in a system including the various engine hardware components in combination with one or more controllers.

This concludes the description. The reading of it by those skilled in the art would bring to mind many alterations and modifications without departing from the spirit and the scope of the description. For example, I3, I4, I5, V6, V8, V10, and V12 engines operating in natural gas, gasoline, diesel, or alternative fuel configurations could use the present description to advantage.

The invention claimed is:

1. An engine control method, comprising:
   deactivating a cylinder of an engine via a controller ceasing to supply fuel to the cylinder, the engine a four stroke engine; and
   drawing air into the deactivated cylinder from a vacuum reservoir during a first stroke of four strokes in a cycle of the deactivated cylinder, the air drawn into the deactivated cylinder without having passed through a passage of an intake manifold that leads to other cylinders of the engine.

2. The method of claim 1, further comprising opening a second intake valve of the deactivated cylinder during the first stroke of the cycle of the deactivated cylinder to draw the air into the deactivated cylinder from the vacuum reservoir.

3. The method of claim 2, further comprising opening a first intake valve of the deactivated cylinder while the second intake valve of the deactivated cylinder is closed during a second stroke of the cycle of the deactivated cylinder.

4. The method of claim 3, further comprising discharging the air to the intake manifold of the engine during the second stroke of the cycle of the deactivated cylinder.

5. The method of claim 4, further comprising opening exhaust valves of the deactivated cylinder while the first and second intake valves of the deactivated cylinder are closed during a third stroke of the cycle of the deactivated cylinder.

6. The method of claim 5, further comprising drawing exhaust gas into the deactivated cylinder during the third stroke of the cycle of the deactivated cylinder.

7. The method of claim 6, further comprising opening the first intake valve of the deactivated cylinder while the second intake valve of the deactivated cylinder is closed during a fourth stroke of the cycle of the deactivated cylinder.

8. An engine control method, comprising:
   operating a cylinder of an engine with four strokes in a first cycle of the engine, the four strokes including a first stroke defined by a first crankshaft angular interval, the first stroke an intake stroke, a second stroke defined by a second crankshaft angular interval, the second stroke a compression stroke, a third stroke defined by a third crankshaft angular interval, the third stroke a power stroke, and a fourth stroke defined by a fourth crankshaft angular interval, the fourth stroke an exhaust stroke;
   deactivating the cylinder of the engine via a controller ceasing to supply fuel to the cylinder; and
   opening exhaust valves of the cylinder during the third crankshaft angular interval of a second cycle of the engine while the cylinder is deactivated and drawing exhaust gas from cylinders other than the cylinder into the cylinder.

9. The method of claim 8, where first and second intake valves of the cylinder are closed during the third crankshaft angular interval of the second cycle of the engine.

10. The method of claim 8, further comprising opening a second intake valve and while a first intake valve of the cylinder is closed during the first crankshaft angular interval of the second cycle of the engine.

11. The method of claim 10, further comprising opening the first intake valve while the second intake valve of the cylinder is closed during the second crankshaft angular interval of the second cycle of the engine.

12. The method of claim 10, further comprising opening the first intake valve while the second intake valve of the cylinder is closed during the fourth crankshaft angular interval of the second cycle of the engine.

13. The method of claim 8, further comprising combusting air and fuel in at least one cylinder of the engine while the cylinder is deactivated.

14. The method of claim 8, further comprising combusting air and fuel in the cylinder during the first cycle of the engine.

15. An engine system, comprising:
   an engine including a plurality of cylinders, one cylinder of the plurality of cylinders including a first intake valve and a passage leading to the one cylinder via a second intake valve, the passage not leading to an area of an intake manifold in pneumatic communication with other engine cylinders of the engine when the second intake valve of the cylinder is closed, the passage in pneumatic communication with a vacuum reservoir.

16. The engine system of claim 15, further comprising a controller, the controller including executable instructions stored in non-transitory memory to open the second intake valve of the cylinder during a first stroke of a cycle of the cylinder to draw air into the cylinder from the vacuum reservoir.

17. The engine system of claim 16, further comprising additional controller instructions to open the first intake valve of the cylinder while the second intake valve of the cylinder is closed during a second stroke of the cycle of the cylinder.

18. The engine system of claim 17, further comprising additional controller instructions to open exhaust valves of the deactivated cylinder while the first and second intake valves of the cylinder are closed during a third stroke of the cycle of the cylinder.

19. The engine system of claim 18, further comprising additional controller instructions to open the first intake valve of the cylinder while the second intake valve of the cylinder is closed during a fourth stroke of the cycle of the cylinder.

20. The engine system of claim 15, where the cylinder is deactivated by ceasing to flow fuel to the cylinder.

* * * * *